United States Patent
Cui et al.

(10) Patent No.: US 10,575,235 B2
(45) Date of Patent: Feb. 25, 2020

(54) FACILITATION OF NETWORK RESOURCE ROUTING AND RESOURCE OPTIMIZATION

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Milap V. Majmundar, Austin, TX (US); Arunabha Ghosh, Austin, TX (US); Weihua Ye, Bartlett, IL (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 168 days.

(21) Appl. No.: 14/735,279

(22) Filed: Jun. 10, 2015

(65) Prior Publication Data
US 2016/0366632 A1 Dec. 15, 2016

(51) Int. Cl.
*H04W 40/04* (2009.01)
*H04W 8/22* (2009.01)
(Continued)

(52) U.S. Cl.
CPC ............ *H04W 40/04* (2013.01); *H04W 8/22* (2013.01); *H04W 16/26* (2013.01); *H04W 28/16* (2013.01); *H04W 84/047* (2013.01); *Y02D 70/00* (2018.01); *Y02D 70/142* (2018.01); *Y02D 70/144* (2018.01); *Y02D 70/146* (2018.01); *Y02D 70/22* (2018.01); *Y02D 70/23* (2018.01); *Y02D 70/24* (2018.01); *Y02D 70/32* (2018.01)

(58) Field of Classification Search
CPC ..... H04W 16/26; H04W 24/04; H04W 28/16; H04W 40/04; H04W 84/047; H04W 8/22; Y02B 60/50
See application file for complete search history.

(56) References Cited

U.S. PATENT DOCUMENTS 7,688,835 B2  3/2010  Kotzin et al.
8,436,768 B2  5/2013  Bull et al.
(Continued)

FOREIGN PATENT DOCUMENTS

WO    2017082949 A1    5/2017

OTHER PUBLICATIONS

Jaber, Mona, et al. "5G backhaul challenges and emerging research directions: A survey." IEEE access 4 (2016): 1743-1766. 24 pages.
(Continued)

*Primary Examiner* — Erica Navar
(74) *Attorney, Agent, or Firm* — Amin, Turocy & Watson, LLP

(57) ABSTRACT

A more efficient network can be achieved using a network-based controller to configure routing tables to route data traffic to and from transmission points. Dynamic partitioning of network resources between the transmission points and a backhaul can be performed in conjunction with a resource scheduler of a network-based controller. The scheduler can relay scheduling metrics or benefit metrics from the network-based controller to the transmission points. Backhaul route optimization can also be used to select relay transmission points based upon conditions being determined to be satisfied.

20 Claims, 12 Drawing Sheets

(51) Int. Cl.
*H04W 28/16* (2009.01)
*H04W 16/26* (2009.01)
*H04W 84/04* (2009.01)

(56) References Cited

U.S. PATENT DOCUMENTS

| | | |
|---|---|---|
| 8,627,468 B2 | 1/2014 | Kakadia et al. |
| 8,830,839 B2 | 9/2014 | Gan et al. |
| 8,838,110 B2 | 9/2014 | Zhang et al. |
| 8,848,534 B2 | 9/2014 | Yang et al. |
| 8,971,263 B2 | 3/2015 | Johansson et al. |
| 9,413,502 B2 | 8/2016 | Tellado et al. |
| 9,635,621 B2 | 4/2017 | Papasakellariou et al. |
| 9,642,146 B2 | 5/2017 | Zhang et al. |
| 2006/0083205 A1* | 4/2006 | Buddhikot ............ H04W 16/14 370/338 |
| 2008/0084855 A1* | 4/2008 | Rahman ................. H04L 67/34 370/342 |
| 2008/0090575 A1* | 4/2008 | Barak ................. H04W 16/10 455/444 |
| 2009/0190522 A1* | 7/2009 | Horn ..................... H04W 40/30 370/315 |
| 2009/0322510 A1* | 12/2009 | Berger ................... G06Q 10/08 340/539.1 |
| 2010/0029282 A1* | 2/2010 | Stamoulis ........... H04L 12/5695 455/436 |
| 2010/0260146 A1* | 10/2010 | Lu ....................... H04L 12/4633 370/331 |
| 2014/0206368 A1* | 7/2014 | Maltsev ............ H04W 72/0406 455/450 |
| 2015/0036571 A1 | 2/2015 | Taori et al. |
| 2015/0055623 A1 | 2/2015 | Li et al. |
| 2015/0071071 A1 | 3/2015 | Hughes et al. |
| 2015/0071248 A1 | 3/2015 | Faerber et al. |
| 2015/0119050 A1 | 4/2015 | Liao et al. |
| 2015/0373615 A1 | 12/2015 | Hampel |
| 2016/0143015 A1 | 5/2016 | Marsch et al. |
| 2016/0366632 A1 | 12/2016 | Cui et al. |
| 2017/0290049 A1 | 10/2017 | Reisslein et al. |
| 2017/0346525 A1 | 11/2017 | Stirling-Gallacher et al. |
| 2017/0347307 A1 | 11/2017 | Mehta et al. |
| 2018/0048442 A1 | 2/2018 | Sang et al. |
| 2018/0063731 A1 | 3/2018 | Ashrafi |
| 2018/0284735 A1 | 10/2018 | Cella et al. |

OTHER PUBLICATIONS

Notice of Allowance received for U.S. Appl. No. 16/056,006 dated Dec. 20, 2019, 28 pages.

\* cited by examiner

FACILITATION OF NETWORK RESOURCE ROUTING AND RESOURCE OPTIMIZATION

TECHNICAL FIELD

This disclosure relates generally to facilitating backhaul resource selection and partitioning. More specifically, this disclosure relates to backhaul route optimization via a network-based controller.

BACKGROUND

In a hierarchical telecommunications network, the backhaul portion of the network can comprise intermediate links between a core network or backbone network and small sub-networks. A backhaul is obliged to carry packets to and from that global network. The backhaul generally refers to a side of the network that communicates with the global Internet, paid for at wholesale commercial access rates to or at an Ethernet exchange or other core network access location. Sometimes, middle mile networks exist between the customer's own local area network and the exchanges. This can be a local wide area network or wireless local area network connection. These can also serve retail networks, which in turn connect buildings and bill customers directly.

Cell phones communicating with a single cell tower constitute a local sub-network. The connection between the cell tower and user equipment begins with a backhaul link to the core of the Internet service provider's network (via a point of presence). The term backhaul may be also be used to describe the entire wired part of a network, although some networks have wireless instead of wired backhaul, in whole or in part. For example, microwave bands, mesh networks, and edge network topologies can use a high-capacity wireless channel to get packets to the microwave or fiber links.

The above-described background relating to a telecommunications backhaul is merely intended to provide a contextual overview, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
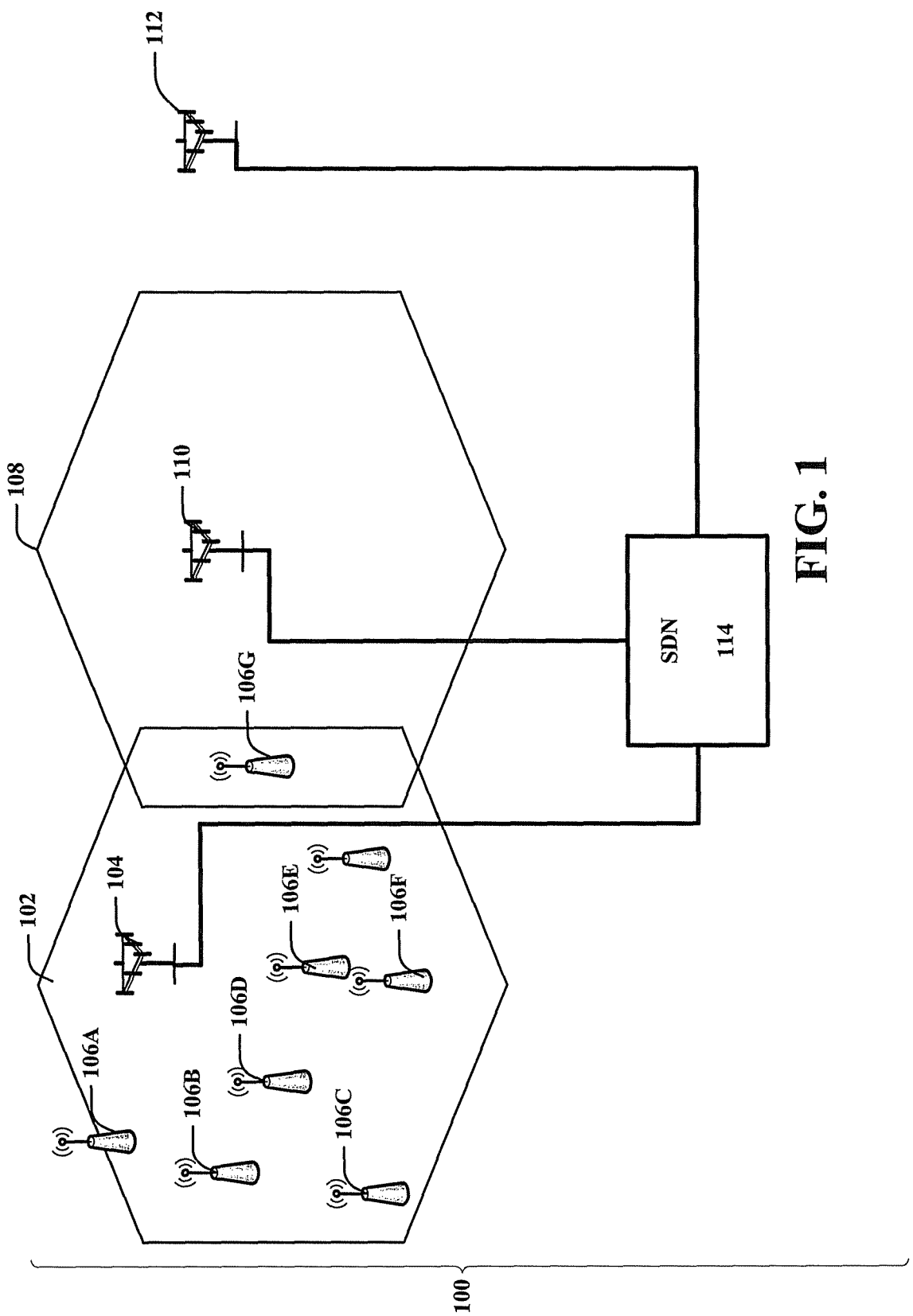
FIG. 1 illustrates an example wireless network comprising a network-based controller according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility backhaul, various embodiments are described herein to facilitate backhaul optimization between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate network backhaul optimization. Facilitating network backhaul optimization can be implemented in connection with any type of device with a connection to a communications network such as: a mobile handset, a computer, a handheld device, or the like.

Mobile network traffic is growing at a very fast pace and the telecommunications industry continues to work to increase network speed and efficiencies. Increased densification of small cells with millimeter-waves will be a key feature of the $5^{th}$ generation (5G) to meet bandwidth demands. However, it is a tremendous challenge to mobile operators to provide adequate backhaul for transmission points. Transmission points can include, but are not limited to, access points, base stations, etc. In-band backhauling using the same spectrum as a transmission point can be leveraged to increase network efficiencies. Since the coverage of small cells is small and some transmission points can be farther away, a multi-hop capability can be used to for one transmission point to relay to another transmission point, which is remote from the one transmission point. Furthermore, a multi-hop capability can be more robust and efficient. The $3^{rd}$ generation partnership package (3GPP) release 9 relay feature only supports single hop relay, and the partitioning of the resources between access and backhaul (relay link) is done in a semi-static fashion. Therefore, a dynamic partitioning, such as that based on a scheduler, is not possible due to the need for provisioning.

Dynamic partitioning and backhaul route optimization can be used to ensure robust 5G self-backhauling. Dynamic partitioning of the resources between transmission points and the backhaul can be performed at a scheduler. The scheduler can utilize a mechanism for relaying scheduling metrics or benefit metrics from a centralized control device to the transmission point. Backhaul route optimization can be used to select relay transmission points in normal operation and can re-route network signals in response to a failure condition being satisfied. A failure condition can be a backhaul route failure due to a backhaul air link quality drop below a threshold of a wireless backhaul link. The failure can also be a wire cut for wireline backhaul, an intermediate node failure, or a combination of the above.

This disclosure proposes enhancements/solutions to the dynamic access/backhaul partitioning and backhaul route optimization for small cell self-backhaul by taking into account network user equipment conditions.

Data related to transmission point conditions can comprise several elements. The transmission point conditions can be identified by a type/profile including, but not limited to: radio technology, bandwidth, output power, etc. The transmission point conditions can also comprise transmission point load data related to each potential relay transmission point. Transmission point backhaul conditions can also be evaluated, wherein the transmission point backhaul conditions can include, but are not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc.

Additional data associated with user equipment information for each transmission point can also be analyzed. The additional data can include, but is not limited to, mobility state, device type, etc. The mobility state can comprise how fast the mobile device/user equipment is moving (slow, fast, etc.) The device type can include, but is not limited to: iphones, ipads, androids, etc. Other data can also include a subscription profile, mobile/stationary, user equipment type (mobile-to-mobile, special requirement on route, etc.), and active/idle state. The subscription profile can comprise various tiers of service, which can be represented by levels such as gold, silver, platinum, etc. During the active state, the user equipment location can be known at the cell level and the mobility can be user equipment assisted and network controlled. The user equipment can monitor control channels associated with shared data channels to determine if the data is scheduled for the user equipment. Channel quality feedback data and neighbor cell measurement data can also be provided by the user equipment during the active state. During the idle state, the user equipment can receive broadcast or multi-cast data, and can monitor a paging channel to detect incoming calls. The user equipment can also perform neighbor cell measurements, cell selection, cell reselection, and acquire system information data. During the idle state, a user equipment discontinuous reception cycle can be configured to enable user equipment power savings. Furthermore, time and history of traffic patterns of potential relay transmission points can be evaluated and dormant transmission points can be enabled to generate new routing paths.

The aforementioned backhaul and transmission point data can be implemented with centralized, distributed, or hybrid control networks. Consequently, software-defined networking (SDN) concepts can be leveraged due to its separation of a control plane from a user plane. The improved programmability of SDNs allows for greater flexibility for the access backhaul partitioning and the backhaul route optimization based on operator policies and network/user equipment conditions. It should be noted that although various implementations of network controllers exist, the SDN is used herein as but an example to convey the relative concepts associated therewith. Since advantages of SDN include improved programmability, flexibility, and separation between control and forwarding, SDN can be used as an example to demonstrate access/backhaul partitioning and route optimization based on operator policies and user equipment conditions.

SDN controllers of the SDNs can be utilized to perform dynamic partitioning of network resources. The SDN controllers can set-up and maintain a network condition table comprising the above-mentioned backhaul and transmission point data, network graph data, and user equipment data. The SDN controller can provide resource partitioning guidance to a scheduler, which can dynamically partition network resources, at each transmission point and backhaul based on a combination of network condition data, user equipment data, and/or operator policy data.

The SDN controllers can also facilitate backhaul route optimization during normal operation or during resource re-routing based on a failure condition. The SDN controllers can make a decision on route optimization based on a combination of the network condition table, backhaul network graph data, user equipment data, and/or operator policy data. The operator policy data can comprise rules and procedures that facilitate efficient data transmission. For example, one policy may state that any transmission point with a backhaul load of greater than forty percent should not be considered during a route optimization procedure. Another policy may state that only voice data shall be transmitted over determined transmission points, or that a channel condition must be favorable for a transmission point to be considered viable. In one embodiment, the SDN controller decision can be made during a radio resource control period (i.e. once every a few 100 msec or more). The backhauling route can be generated on a per user equipment basis, a per session/service basis, or a per transmission point basis. For any small cell backhauling, there can be one or multiple simultaneous paths between the small cell and a target site (e.g. macro or broadband connection). Thus, the multiple paths can provide a robust backhaul link for a 5G network.

In one embodiment, described herein is a method comprising sending network resource partitioning guidance data to a relay transmission point device to inform the relay transmission point device with guidance relating to partitioning a network resource of the network. The resource partitioning guidance data is based on relay transmission point data related to a network condition and mobile device data related to a mobile device.

According to another embodiment a system can facilitate selecting a relay transmission point device based on updated data and service provider policy data. The system can receive relay transmission point data related to a network condition and receive device data related to a mobile device. Thereafter, the system can update the relay transmission point data, the mobile device data, and a network data structure, resulting in the updated data being used to select the transmission point device.

According to yet another embodiment, described herein is a computer readable medium that can perform the operations comprising receiving relay transmission point data, receiving mobile device data related to a mobile device, and receiving service provider policy data related to a service provider identity. The computer readable medium can then take the data and update a network table based on the relay transmission point data, the mobile device data, and the service provider policy data to select a relay transmission point device and send backhaul partitioning guidance data.

These and other embodiments or implementations are described in more detail below with reference to the drawings.

Referring now to FIG. 1, illustrated is a wireless network 100 comprising a network controller 114 according to one or more embodiments. The wireless network 100 can comprise several microcell transmission points 106(A, B, C, D, E, F, G), which can communicate with macrocell transmission points 104, 110, 112. As represented in FIG. 1, the macrocell 104 can cover the network area 102 and the macrocell 110 can cover the network area 108. Some microcell transmission points 106(A, B, C, D, E, F), can be exclusively within the network area 102, and other microcell transmission points 106G can be covered by multiple network areas 102 108.

The network controller 114 can determine the transmission point 106 selection to improve resource allocation. The network controller 114, which can be an SDN controller, can receive data to generate and maintain a transmission point condition table comprising backhaul and transmission point data, network graph data, and user equipment data. Data related to transmission point conditions can comprise: radio technology, bandwidth, output power, etc. The transmission point conditions can also comprise transmission point load data related to each potential relay transmission point 104 106 110 112. Furthermore, transmission point backhaul conditions can also be maintained in the table. Transmission point backhaul conditions can include, but are not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. The user equipment data can comprise: mobility state, device type, subscription profile, mobile/stationary, user equipment type (mobile-to-mobile, special requirement on route, etc.), and active/idle state. Furthermore, the transmission point condition data can include time and history of traffic patterns of potential relay transmission points 104 106 110 112.

Before, during, and after the network controller generates the transmission point condition table (in the form of a data structure), the network controller 114 can analyze and/or evaluate the transmission point conditions to make a determination of the most efficient path from the user equipment to the macrocell 104 110 112. The network controller 114 can also receive operator policy data, wherein the operator policy data can comprise rules and procedures that facilitate efficient data transmission. For example, one policy may state that any transmission point 104 106 110 112 with an access load of greater than forty percent should not be considered during a route optimization procedure. Another policy may state that only text data shall be transmitted over determined transmission points 104 106 110 112, or that a channel condition must have a rating of "good" to be favorable for a transmission point 104 106 110 112 to be considered viable.

Based on the transmission point condition table, the operator policy data, and the user equipment data, the network controller 114 can also provide resource partitioning guidance to a scheduler, which can dynamically partition network resources, at each transmission point 104 106 110 112 and backhaul. For example, based on data received by the network controller 114, the network controller 114 can provide guidance to the scheduler of the transmission point 104 106 110 112 to facilitate a partitioning of network resources between the backhaul and the transmission point 104 106 110 112.

Figure 2:
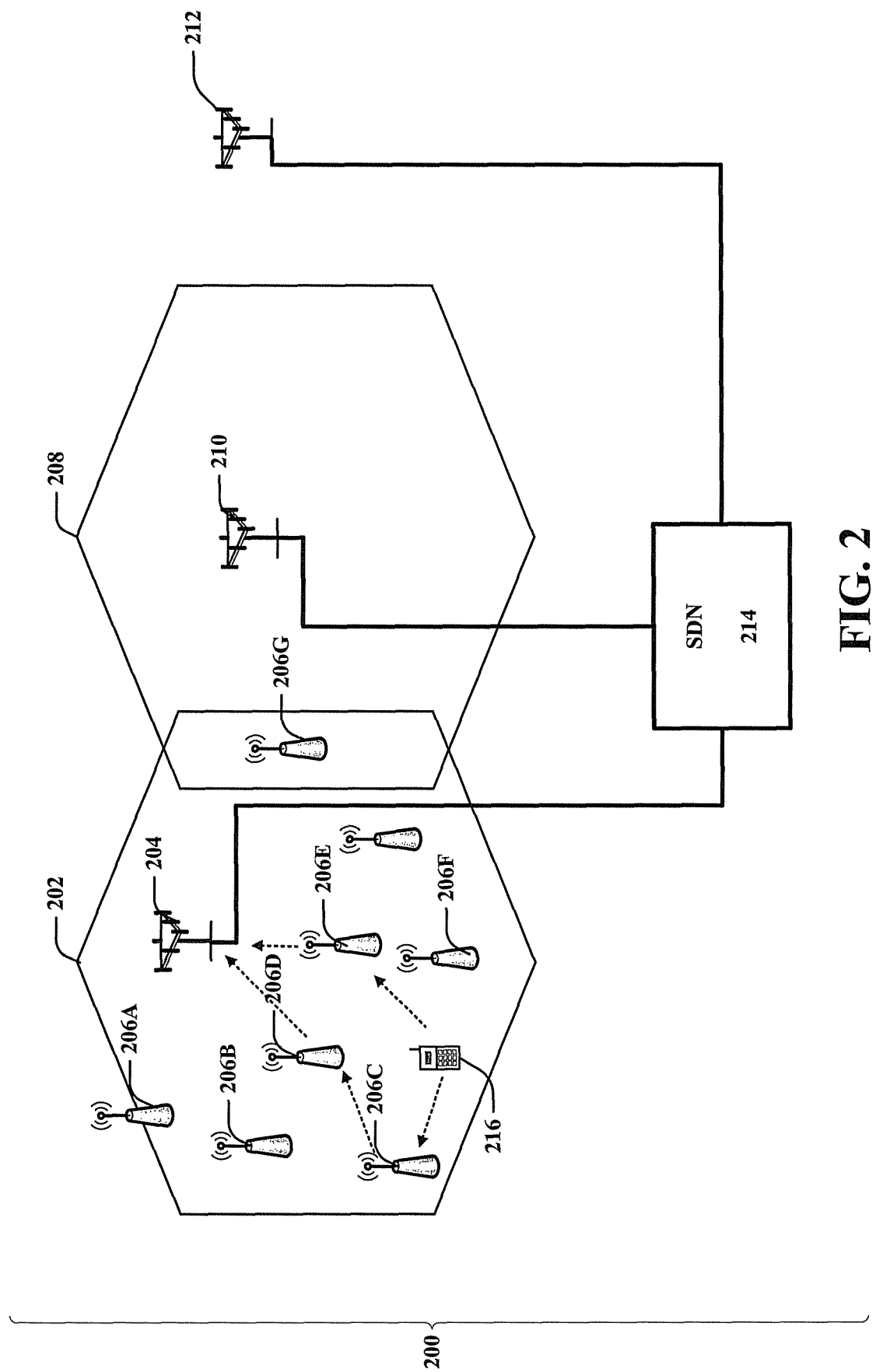
FIG. 2 illustrates an example wireless network comprising a network-based controller performing backhaul routing for user equipment according to one or more embodiments.

Referring now to FIG. 2, illustrated is a wireless network 200 comprising a network controller 214 performing backhaul routing for user equipment according to one or more embodiments. The wireless network 200 can comprise several microcell transmission points 206(A, B, C, D, E, F, G), which can communicate with macrocell transmission points 204, 210, 212. As represented in FIG. 2, the macrocell 204 can cover the network area 202 and the macrocell 210 can cover the network area 208. Some microcell transmission points 106(A, B, C, D, E, F), can be exclusively within the network area 202, and other microcell transmission points 206G can be covered by multiple network areas 202 208.

The network controller 214 can determine transmission point 206 selection to improve resource allocation. The network controller 214, which can be an SDN controller, can receive data to generate and maintain a transmission point condition table comprising backhaul and transmission point data, network graph data, and user equipment data. Data related to transmission point conditions can comprise: radio technology, bandwidth, output power, etc. The transmission point conditions can also comprise transmission point load data related to each potential relay transmission point 204 206 210 212. Furthermore, transmission point backhaul conditions can also be maintained in the table. Transmission point backhaul conditions can include, but are not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. The user equipment data can comprise: mobility state, device type, subscription profile, mobile/stationary, user equipment type (mobile-to-mobile, special requirement on route, etc.), and active/idle state. Furthermore, the transmission point condition data can include time and history of traffic patterns of potential relay transmission points 204 206 210 212.

Before, during, and after the network controller generates the transmission point condition table (in the form of a data structure), the network controller 214 can analyze and/or evaluate the transmission point conditions to make a determination of the most efficient path from the user equipment to the macrocell 204 210 212. The network controller 214 can also receive operator policy data, wherein the operator policy data can comprise rules and procedures that facilitate efficient data transmission. For example, one policy may state that any transmission point 204 206 210 212 with an access load of greater than forty percent should not be considered during a route optimization procedure. Another policy may state that only text data shall be transmitted over determined transmission points 204 206 210 212, or that a channel condition must have a rating of "good" to be favorable for a transmission point 204 206 210 212 to be considered viable. As represented in FIG. 2, the user equipment or mobile device 216 can have hop options for how data is transmitted to the macrocell 204. The data from the mobile device 216 can be transmitted to the macrocell 204 via transmission point 206C and transmission point 206D or via transmission point 206E. It should be noted that the data can be transmitted via any transmission point that provides the most efficient transmission based on the network controllers 214 evaluation of the transmission point data, the network graph data, and the user equipment data.

Based on the transmission point condition table, the operator policy data, and the user equipment data, the network controller 214 can also provide resource partitioning guidance to a scheduler, which can dynamically partition network resources, at each transmission point 204 206 210 212 and backhaul. For example, based on data received by the network controller 214, the network controller 214 can provide guidance to the scheduler of the transmission point 204 206 210 212 to facilitate a partitioning of network resources between the backhaul and the transmission point 204 206 210 212.

Figure 3:
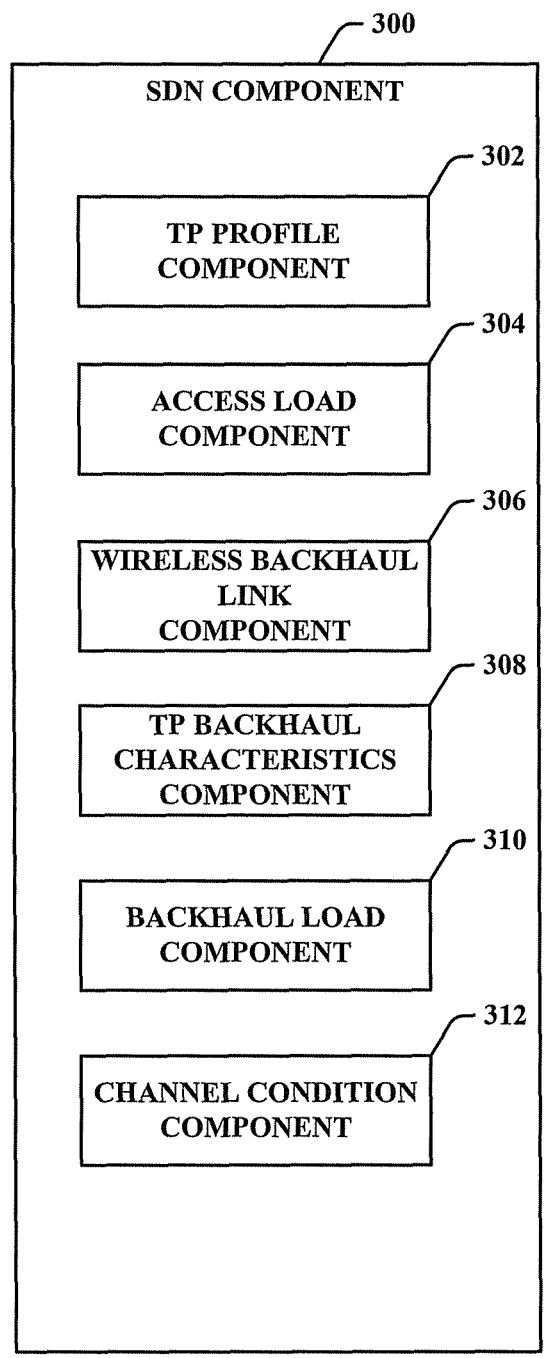
FIG. 3 illustrates an example network controller according to one or more embodiments.

Referring now to FIG. 3, illustrated is a network controller 300 according to one or more embodiments. The network controller 300 can determine transmission point selection to improve resource allocation. The network controller 300, which can be an SDN controller, can receive data to generate and maintain a transmission point condition table comprising backhaul and transmission point data, network graph data, and user equipment data. The transmission point data can be stored in the transmission point component 302 of the network controller 300. Data related to transmission point conditions can comprise: radio technology, bandwidth, output power, etc. The network controller 300 can also comprise a transmission point load component 304 related to each potential relay transmission point. Furthermore, the network controller 300 can comprise several backhaul-related components including, but not limited to: a backhaul link component 306, a backhaul characteristics component 308 (e.g. bandwidth, fiber, etc.), a backhaul load component 310, and a backhaul link channel conditions component 312.

Figure 4:
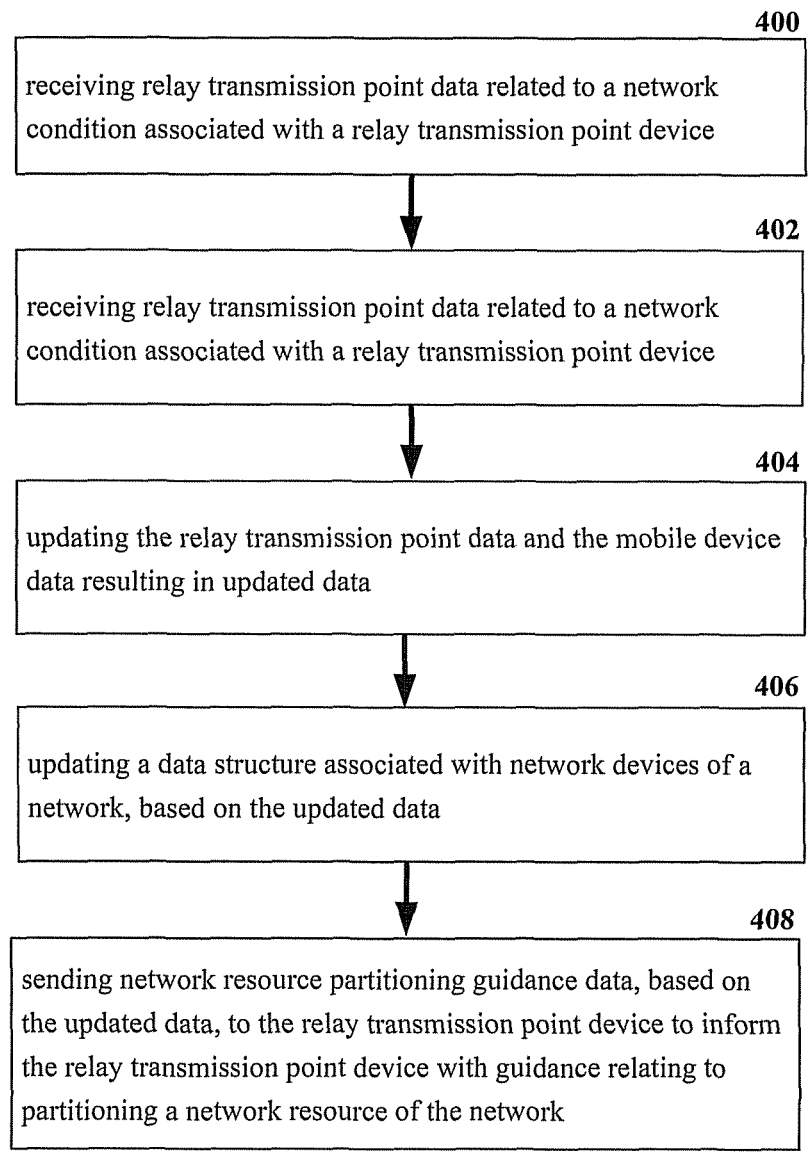
FIG. 4 illustrates an example schematic system block diagram for partitioning network resources according to one or more embodiments.

Referring now to FIG. 4, illustrated is a schematic system block diagram for partitioning network resources according to one or more embodiments. At element 400, relay transmission point data related to a network condition associated with a relay transmission point device can be received. The network conditions related to the transmission point can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point condition data can include time and history of traffic patterns of potential relay transmission points.

Mobile device data related to a mobile device can be received at element 402. User equipment or mobile device data can comprise: a mobility state, a device type, a subscription profile, a mobile/stationary profile, a user equipment type (mobile-to-mobile, special requirement on route, etc.), an active/idle state, etc. The relay transmission point data and the mobile device data can be updated at element 404 resulting in updated data. A data structure associated with network devices of a network can be updated at element 406 based on the updated data. At element 408, network resource partitioning guidance based on the updated data can be sent to the relay transmission point device to inform the relay transmission point device with guidance relating to partitioning a network resource of the network. The guidance can comprise an optical transmission route or data associated with allocating network resources according to operator policy data, mobile device data, and/or transmission point data.

Figure 5:
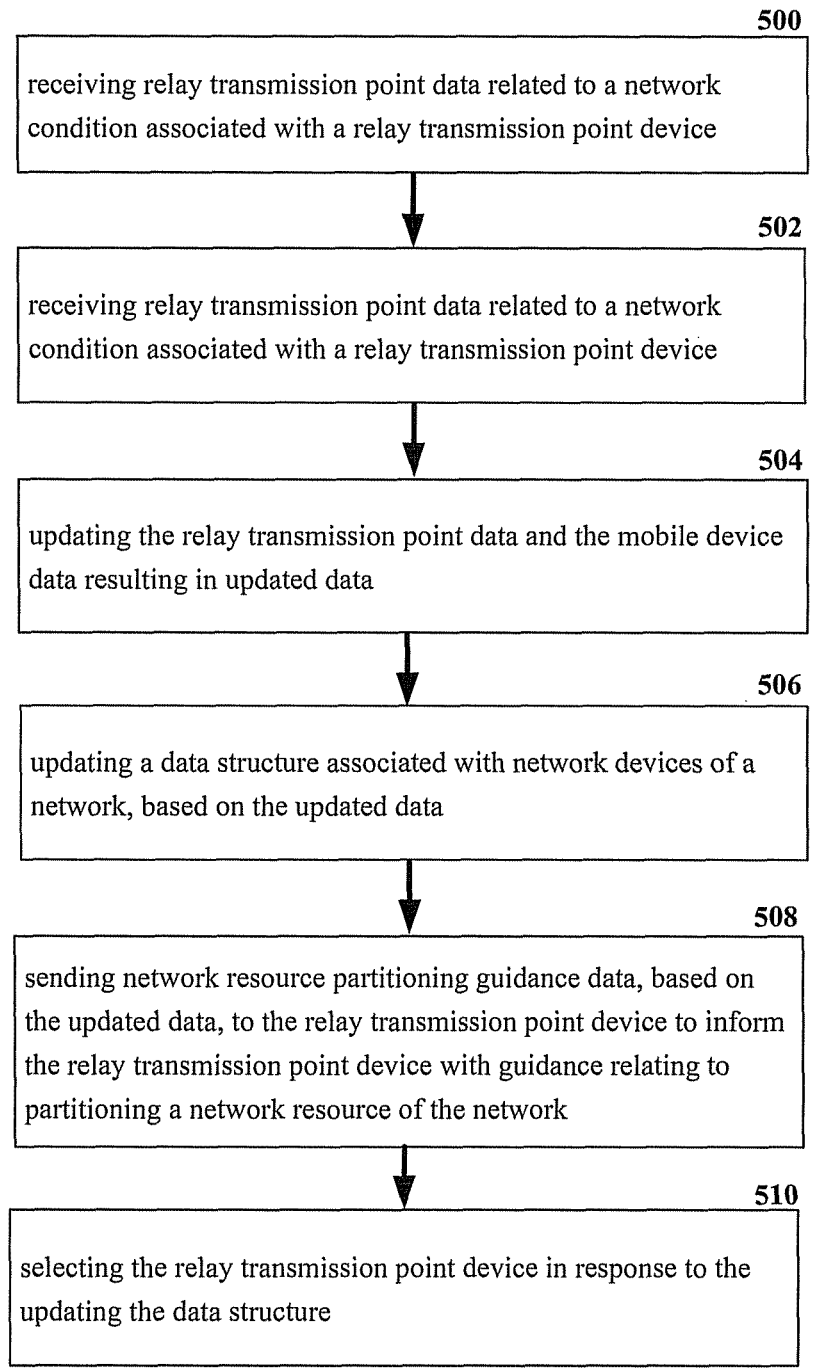
FIG. 5 illustrates an example schematic system block diagram for partitioning network resources and selecting a transmission point device according to one or more embodiments.

Referring now to FIG. 5, illustrated is a schematic system block diagram for partitioning network resources and selecting a transmission point device according to one or more embodiments. At element 500, relay transmission point data related to a network condition associated with a relay transmission point device can be received. The network conditions related to the transmission point can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point condition data can include time and history of traffic patterns of potential relay transmission points.

Mobile device data related to a mobile device can be received at element 502. User equipment or mobile device data can comprise: a mobility state, a device type, a subscription profile, a mobile/stationary profile, a user equipment type (mobile-to-mobile, special requirement on route, etc.), an active/idle state, etc. The relay transmission point data and the mobile device data can be updated at element 504 resulting in updated data. A data structure associated with network devices of a network can be updated at element 506 based on the updated data. At element 508, network resource partitioning guidance based on the updated data can be sent to the relay transmission point device to inform the relay transmission point device with guidance relating to partitioning a network resource of the network. The guidance can comprise an optical transmission route or data associated with allocating network resources according to operator policy data, mobile device data, and/or transmission point data. At element 510 the relay transmission point device can be selected in response to the updating the data structure.

Figure 6:
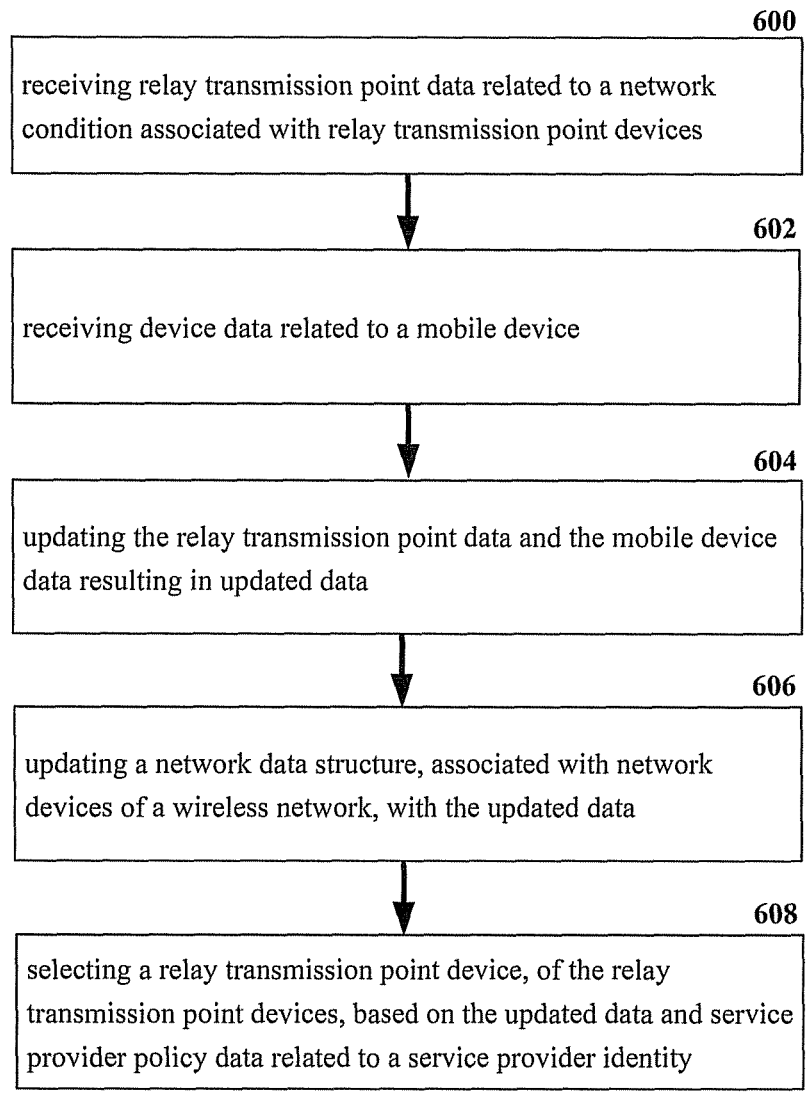
FIG. 6 illustrates an example schematic system block diagram for selecting a transmission point device based on updated data and service provider policy data according to one or more embodiments.

Referring now to FIG. 6, illustrated is a schematic system block diagram for selecting a transmission point device based on updated data and service provider policy data according to one or more embodiments. At element 600, relay transmission point data related to a network condition associated with relay transmission point devices can be received. The relay transmission point data can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point data can include time and history of traffic patterns of potential relay transmission points.

At element 602, device data related to a mobile device can be received. User equipment or mobile device data can comprise: a mobility state, a device type, a subscription profile, a mobile/stationary profile, a user equipment type (mobile-to-mobile, special requirement on route, etc.), an active/idle state, etc. The relay transmission point data and the mobile device data can be updated at element 604, resulting in updated data. Furthermore, a network data structure, associated with network devices of a wireless network, can be updated with the updated data at element 606. Consequently, a relay transmission point device, of the relay transmission point devices, can be selected at element 608 based on the updated data and service provider policy data related to a service provider identity.

Figure 7:
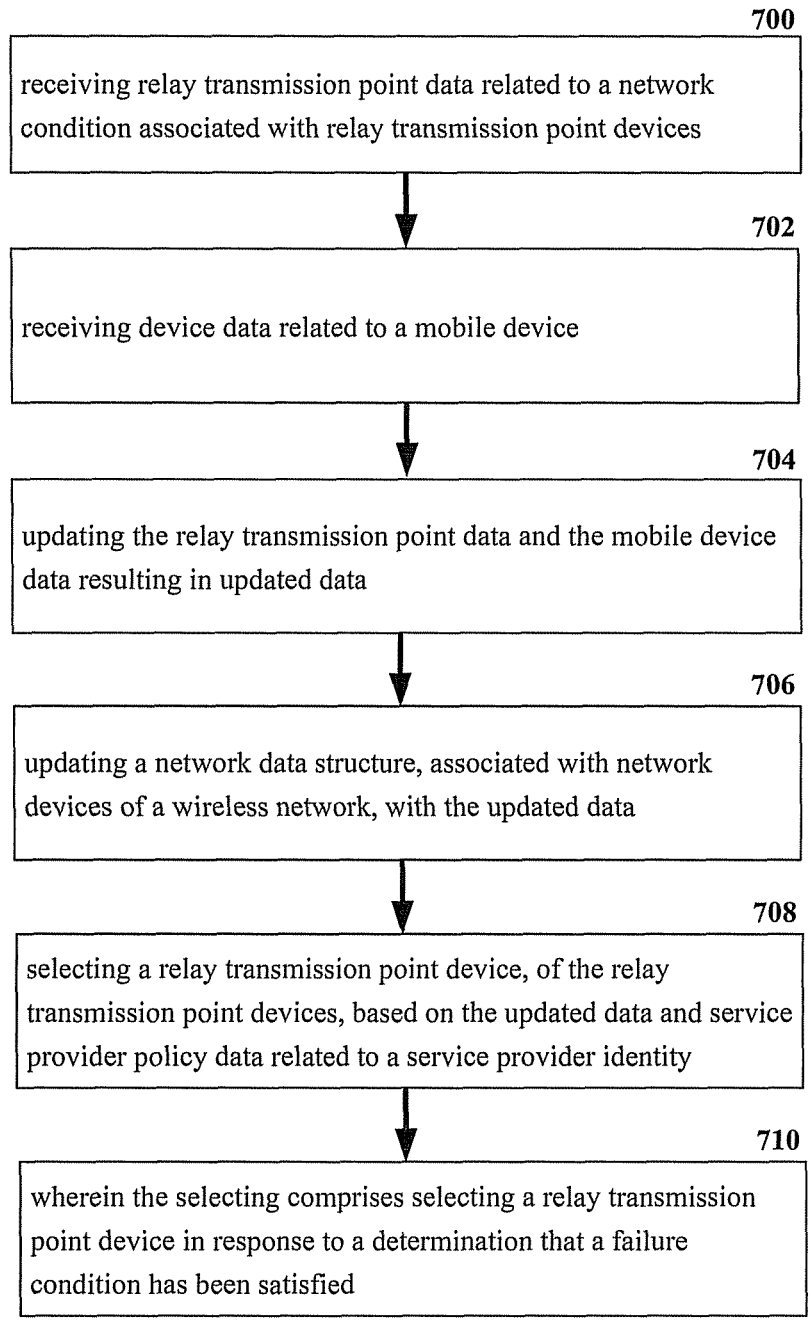
FIG. 7 illustrates an example schematic system block diagram for selecting a transmission point device in response to a condition being satisfied and based on updated data and service provider policy data according to one or more embodiments.

Referring now to FIG. 7, illustrated is a schematic system block diagram for selecting a transmission point device in response to a condition being satisfied and based on updated data and service provider policy data according to one or more embodiments. At element 700, relay transmission point data related to a network condition associated with relay transmission point devices can be received. The relay transmission point data can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point data can include time and history of traffic patterns of potential relay transmission points.

At element 702, device data related to a mobile device can be received. User equipment or mobile device data can comprise: a mobility state, a device type, a subscription profile, a mobile/stationary profile, a user equipment type (mobile-to-mobile, special requirement on route, etc.), an active/idle state, etc. The relay transmission point data and the mobile device data can be updated at element 704, resulting in updated data. Furthermore, a network data structure, associated with network devices of a wireless network, can be updated with the updated data at element 706. Consequently, a relay transmission point device, of the relay transmission point devices, can be selected at element 708 based on the updated data and service provider policy data related to a service provider identity. Selecting the relay transmission point device at element 708 can comprise selecting a relay transmission point device in response to a determination that a failure condition has been satisfied at element 710.

Figure 8:
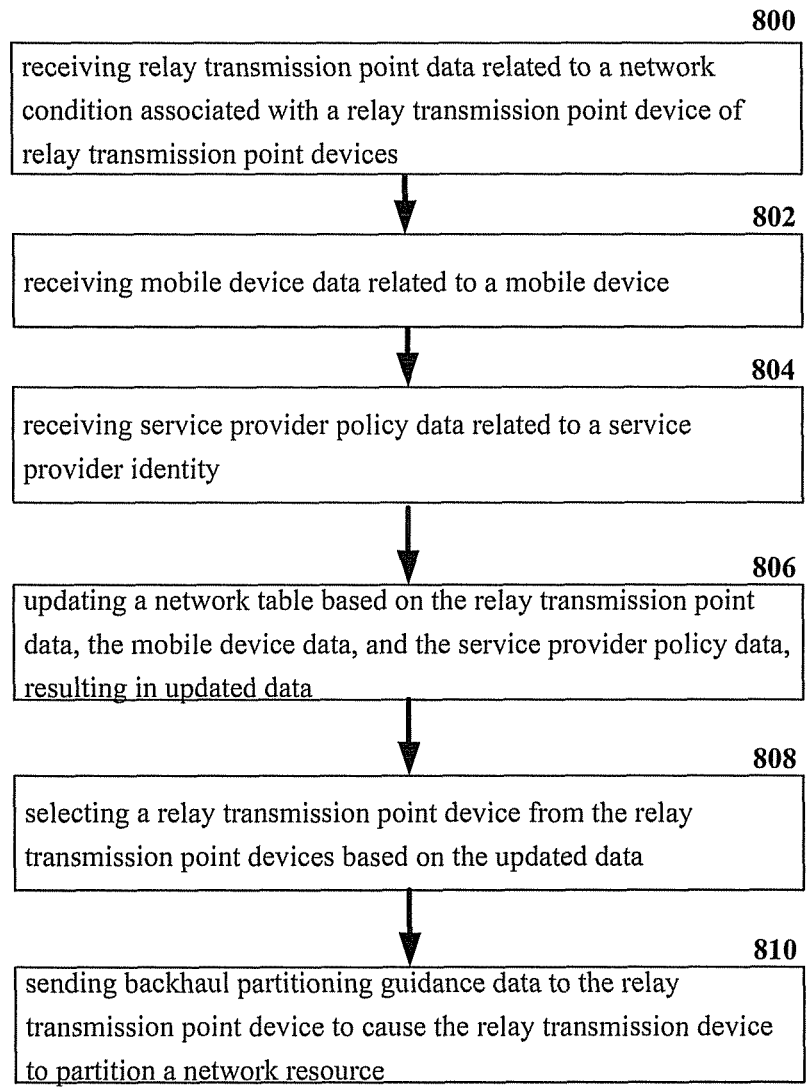
FIG. 8 illustrates an example schematic system block diagram for partitioning network resources according to one or more embodiments.

Referring now to FIG. 8, illustrated is a schematic system block diagram for partitioning network resources according to one or more embodiments. At element 800, relay transmission point data related to a network condition associated with a relay transmission point device of relay transmission point devices can be received. The relay transmission point data can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point data can include time and history of traffic patterns of potential relay transmission points.

Mobile device data related to a mobile device can be received at element 802. User equipment or mobile device data can comprise: a mobility state, a device type, a subscription profile, a mobile/stationary profile, a user equipment type (mobile-to-mobile, special requirement on route, etc.), an active/idle state, etc. At element 804, service provider policy data related to a service provider identity can be received, and a network table based on the relay transmission point data, the mobile device data, and the service provider policy data can be updated at element 806, resulting in updated data. At element 808, a relay transmission point device from the relay transmission point devices can be selected based on the updated data of element 806. At element 810, backhaul partitioning guidance data can be sent to the relay transmission point device to cause the relay transmission device to partition a network resource.

Figure 9:
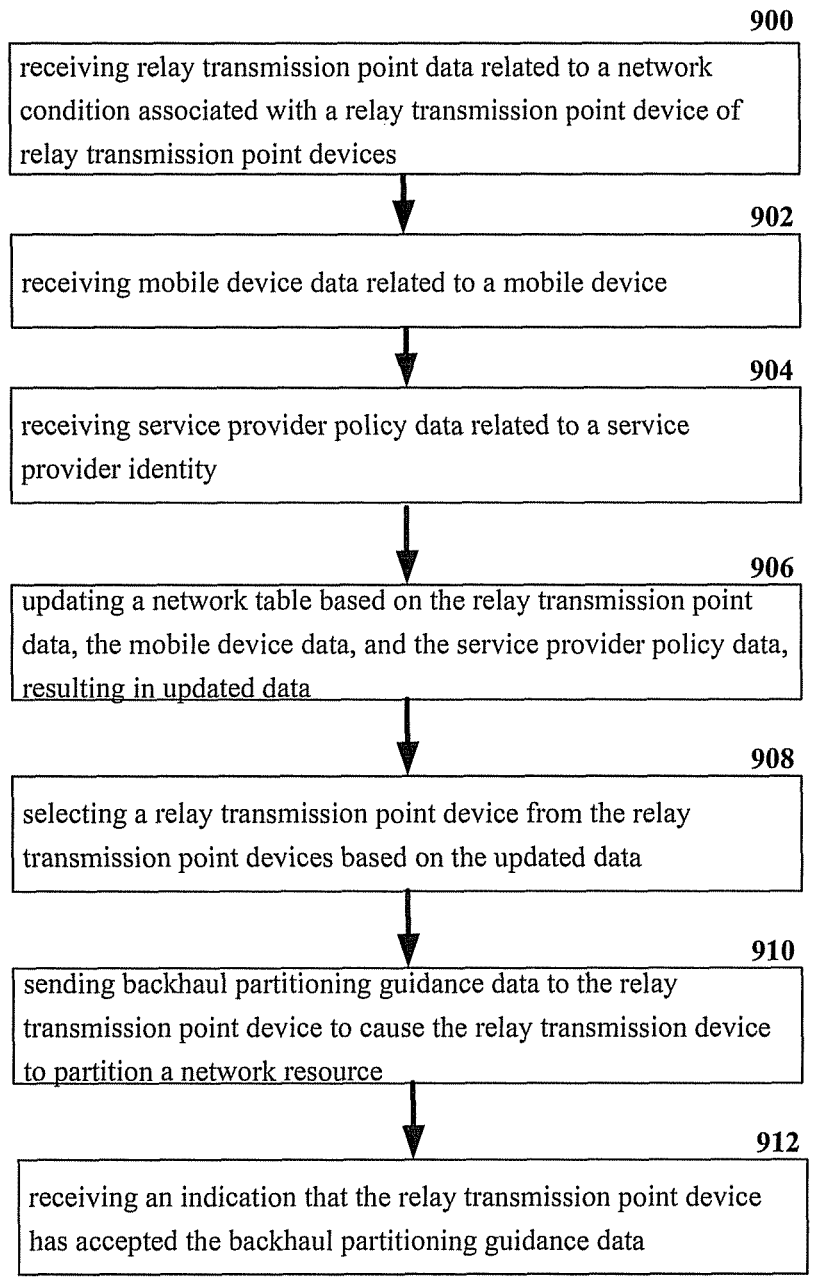
FIG. 9 illustrates an example schematic system block diagram for partitioning network resources and receiving an indication of acceptance according to one or more embodiments.

Referring now to FIG. 9, illustrated is a schematic system block diagram for partitioning network resources and receiving an indication of acceptance according to one or more embodiments. At element 900, relay transmission point data related to a network condition associated with a relay transmission point device of relay transmission point devices can be received. The relay transmission point data can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point data can include time and history of traffic patterns of potential relay transmission points.

Mobile device data related to a mobile device can be received at element 902. User equipment or mobile device data can comprise: a mobility state, a device type, a subscription profile, a mobile/stationary profile, a user equipment type (mobile-to-mobile, special requirement on route, etc.), an active/idle state, etc. At element 904, service provider policy data related to a service provider identity can be received, and a network table based on the relay transmission point data, the mobile device data, and the service provider policy data can be updated at element 906, resulting in updated data. At element 908, a relay transmission point device from the relay transmission point devices can be selected based on the updated data of element 906. At element 910, backhaul partitioning guidance data can be sent to the relay transmission point device to cause the relay transmission device to partition a network resource. Thus, an indication that the relay transmission point device has accepted the backhaul partitioning guidance data can be received at element 912.

Figure 10:
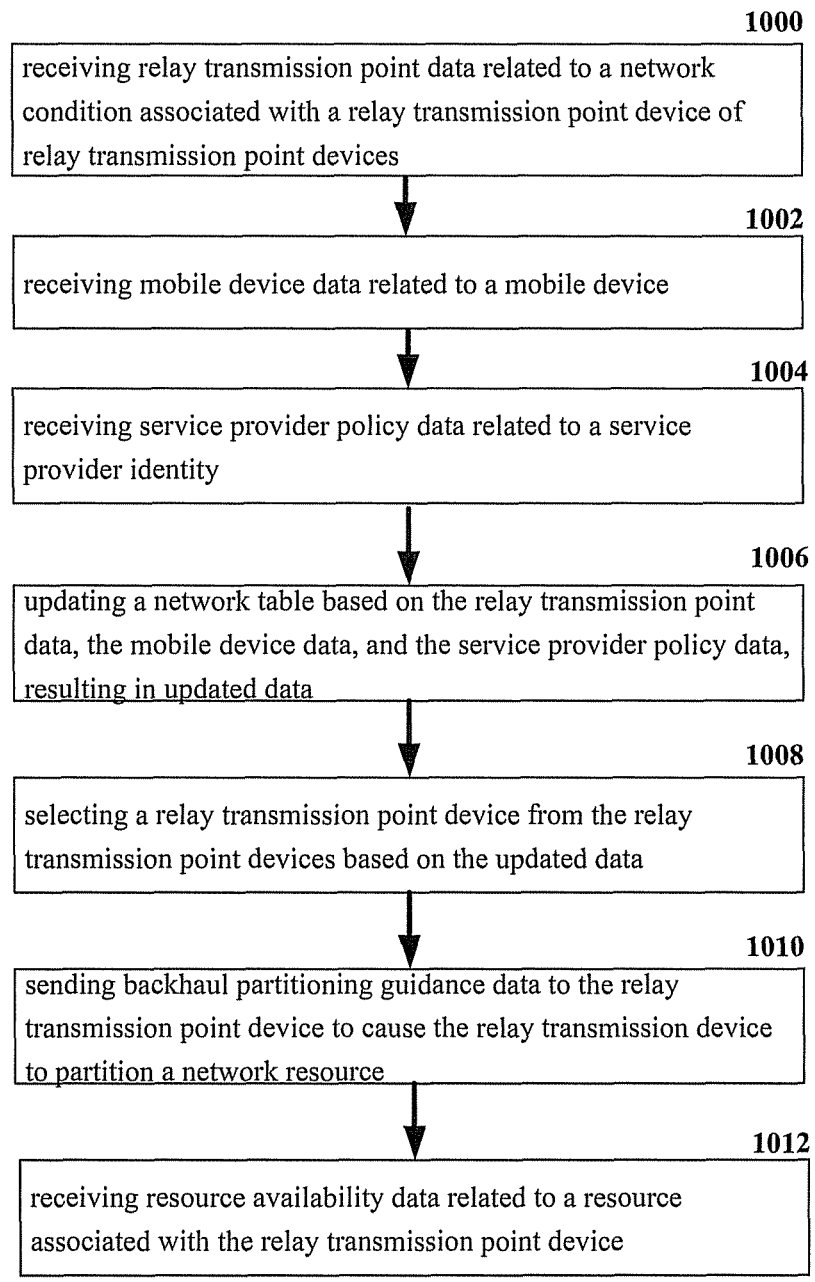
FIG. 10 illustrates an example schematic system block diagram for partitioning network resources and receiving resource availability data according to one or more embodiments.

Referring now to FIG. 10, illustrated is a schematic system block diagram for partitioning network resources and receiving resource availability data according to one or more embodiments. At element 1000, relay transmission point data related to a network condition associated with a relay transmission point device of relay transmission point devices can be received. The relay transmission point data can comprise transmission point load data related to each potential relay transmission point and transmission point backhaul conditions including, but not limited to: backhaul links, characteristics of each backhaul link (e.g. bandwidth, fiber, etc.), backhaul link load, backhaul link channel conditions, distance to a destination point (e.g. macro site or a site with wireline broadband connectivity), etc. Furthermore, the transmission point data can include time and history of traffic patterns of potential relay transmission points.

Mobile device data related to a mobile device can be received at element 1002. User equipment or mobile device data can comprise: a mobility state, a device type, a subscription profile, a mobile/stationary profile, a user equipment type (mobile-to-mobile, special requirement on route, etc.), an active/idle state, etc. At element 1004, service provider policy data related to a service provider identity can be received, and a network table based on the relay transmission point data, the mobile device data, and the service provider policy data can be updated at element 1006, resulting in updated data. At element 1008, a relay transmission point device from the relay transmission point devices can be selected based on the updated data of element 1006. At element 1010, backhaul partitioning guidance data can be sent to the relay transmission point device to cause the relay transmission device to partition a network resource. Consequently, resource availability data related to a resource associated with the relay transmission point device can be received at element 1012.

Figure 11:
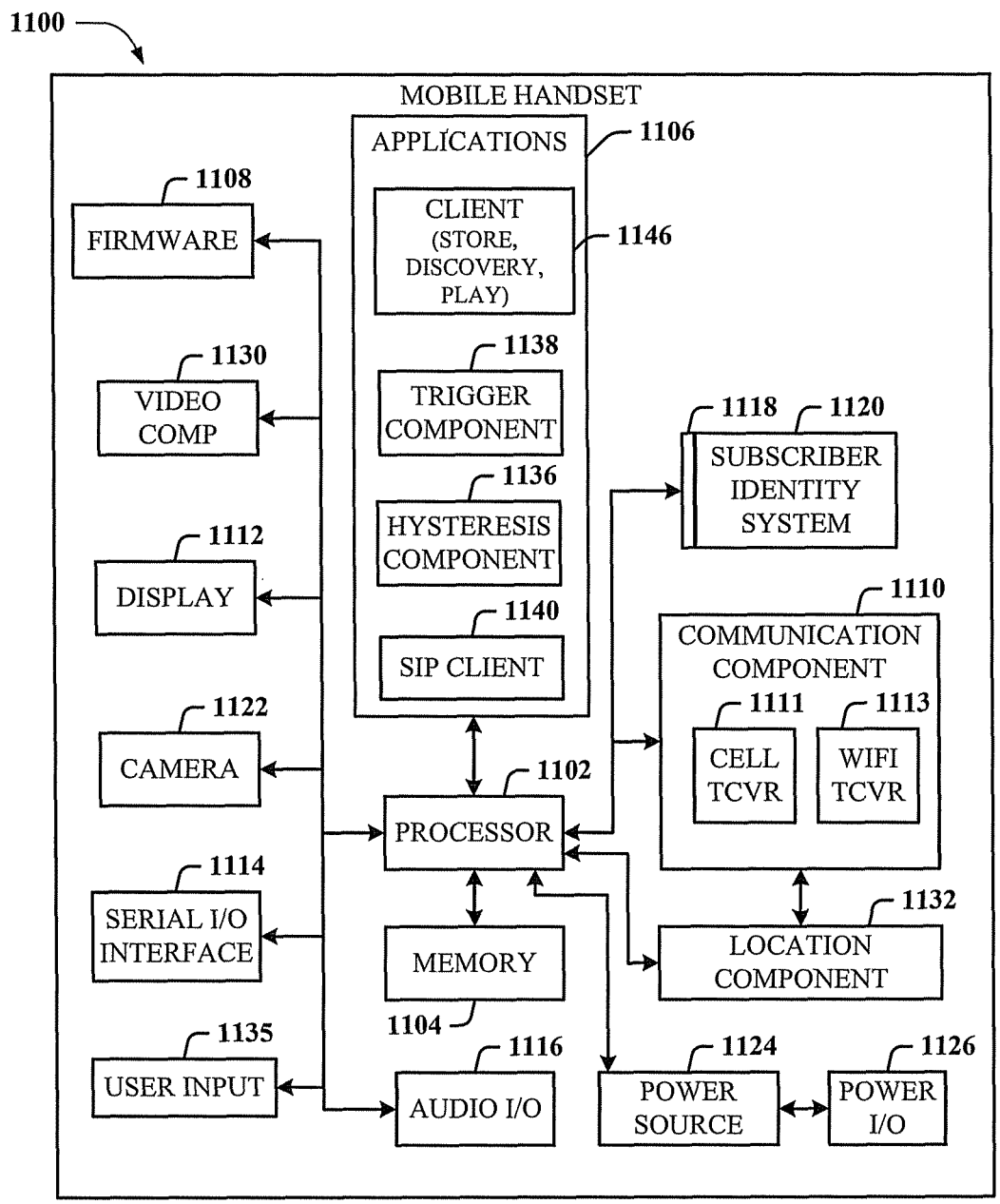
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
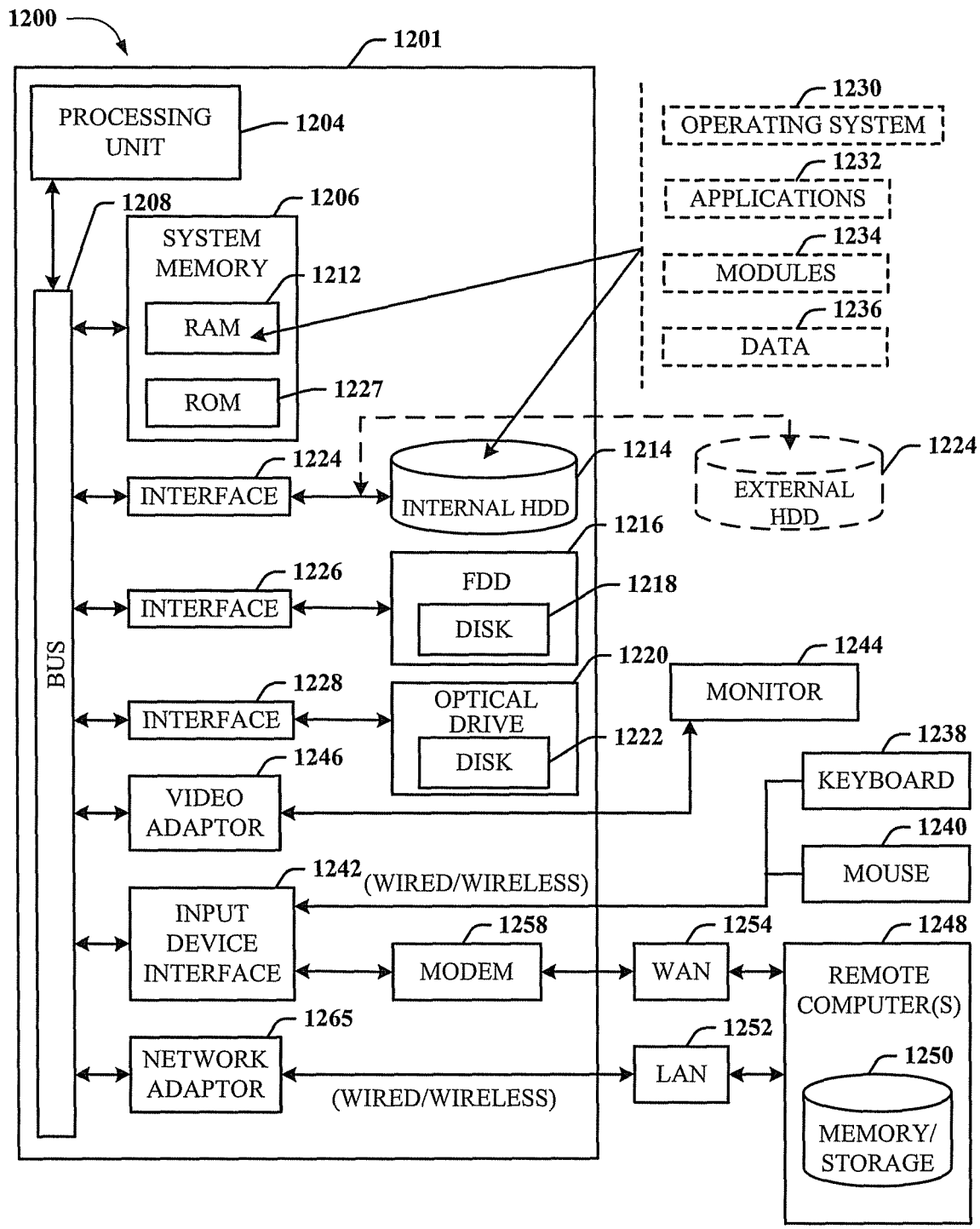
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A route optimization method, comprising:
    receiving, by a network device comprising a processor, relay transmission point data related to a network condition associated with a first relay transmission point device;
    receiving, by the network device, mobile device data related to a mobile device;

updating, by the network device, the relay transmission point data and the mobile device data resulting in updated data;

based on the updated data and in response to a first policy data condition being determined to have been satisfied, updating, by the network device, a data structure associated with network devices of a network, wherein the first policy data condition is associated with a first access load of the first relay transmission point device and a rating associated with a channel, to be used by the first relay transmission point device, that has been determined to have been satisfied;

in response to a second policy data condition associated with a second access load of a second relay transmission point device being determined to have been satisfied, excluding the second relay transmission point device from a route optimization procedure;

in response to an indication that the first relay transmission point device is a currently dormant transmission point device, enabling, by the network device, the first relay transmission point device to generate a routing path; and sending, by the network device, network resource partitioning data to the first relay transmission point device for use in partitioning a network resource of the network device, wherein the network resource partitioning data comprises restriction data representative of an instruction to restrict a transmission by the first relay transmission point device to the transmission of text data to the network device.

2. The route optimization method of claim 1, wherein the updated data comprises policy data associated with a service provider identity.

3. The route optimization method of claim 2, wherein the network condition is associated with a bandwidth of the first relay transmission point device.

4. The route optimization method of claim 1, further comprising:
in response to the updating the data structure, selecting, by the network device, the first relay transmission point device.

5. The route optimization method of claim 4, wherein the selecting comprises selecting a backhaul route based on a distance between the mobile device and the first relay transmission point device.

6. The route optimization method of claim 4, wherein the selecting comprises selecting a backhaul route based on a mobile device identity.

7. The route optimization method of claim 4, wherein the selecting comprises selecting a backhaul route based on an identity of the first relay transmission point device.

8. A route optimization system, comprising:
a processor; and
a memory that stores executable instructions that, when executed by the processor, facilitate performance of operations, comprising:
receiving relay transmission point data related to a network condition associated with relay transmission point devices;
receiving device data related to a mobile device;
updating the relay transmission point data and the device data resulting in updated data;
based on the updated data and in response to a first policy data condition being determined to have been satisfied, updating a network data structure, associated with network devices of a wireless network, with the updated data, wherein the first policy data condition is associated with an access load of a first relay transmission point device of the relay transmission point devices, and wherein the first policy data condition is associated with a rating of a channel being determined to have been satisfied;

in response to a second policy data condition being determined to have been satisfied, precluding a second relay transmission point device of the relay transmission point devices from participating in a route optimization procedure;

in response to an indication that the first relay transmission point device is a dormant transmission point device, enabling the first relay transmission point device to generate a routing path associated with the first relay transmission point device; and based on the routing path, sending network resource partitioning data to the first relay transmission point device for use in partitioning a network resource of a network device of the network devices, wherein the network resource partitioning data comprises restriction data representative of a way to restrict transmissions of the first relay transmission point device to text transmissions of text data to the network device.

9. The route optimization system of claim 8, wherein the operations further comprise:
selecting the first relay transmission point device in response to a determination that a failure condition has been satisfied.

10. The route optimization system of claim 8, wherein the first relay transmission point data comprises bandwidth data related to the relay transmission point devices.

11. The route optimization system of claim 8, wherein the network condition is related to a backhaul link load associated with the network devices.

12. The route optimization system of claim 11, wherein the network resource comprises a radio resource associated with the transmission point devices.

13. The route optimization system of claim 11, wherein the network resource comprises an output power associated with the transmission point devices.

14. The route optimization system of claim 9, wherein the selecting the first relay transmission point device is based on traffic pattern data associated with the mobile device and the relay transmission point devices.

15. A machine-readable storage medium, comprising executable instructions that, when executed by a processor, facilitate performance of route optimization operations, comprising:
receiving relay transmission point data related to a network condition associated with a first relay transmission point device of relay transmission point devices;
receiving mobile device data related to a mobile device;
updating the relay transmission point data and the mobile device data, resulting in updated data; and
based on the updated data and in response to a first policy data condition being determined to have been satisfied, updating a data structure associated with a network device, wherein the policy data condition is associated with a first access load of the first relay transmission point device, and wherein the policy data condition is associated with a rating of a channel to be used by the first relay transmission point device;

in response to an indication that the first relay transmission point device has been determined to have been a dormant transmission point device, enabling the first relay transmission point device to generate routing path data representative of a routing path associated with the first relay transmission point device;

using the routing path data, sending network resource partitioning data related to a backhaul partition to the first relay transmission point device for use in partitioning a network resource of the network device, wherein the network resource partitioning data comprises an instruction to restrict the first relay transmission point device to transmitting text data to the network device; and based on a threshold value associated with a second access load of a second relay transmission point device being determined to have been satisfied, restricting the second relay transmission point device from receiving the network resource partitioning data for use in partitioning the network resource.

16. The machine-readable storage medium of claim 15, wherein the indication is a first indication, and wherein the route optimization operations further comprise:

receiving a second indication that the first relay transmission point device has accepted the instruction.

17. The machine-readable storage medium of claim 15, wherein the route optimization operations further comprise:

receiving resource availability data related to a resource associated with the first relay transmission point device.

18. The machine-readable storage medium of claim 17, wherein the resource availability data comprises backhaul link load data associated with the first relay transmission point device.

19. The machine-readable storage medium of claim 17, wherein the resource availability data comprises bandwidth data associated with the relay transmission point devices.

20. The machine-readable storage medium of claim 15, wherein the routing path data is first routing path data, and wherein the route optimization operations further comprise:

selecting a third relay transmission point device, of the relay transmission point devices, to generate second routing path data representing a transmission routing path comprising at least the first relay transmission point device and the third transmission point device.

* * * * *